United States Patent [19]
Weinstein

[11] 4,205,153
[45] May 27, 1980

[54] DIENE INTERPOLYMERS WITH HALOGENATED MONOMERS

[75] Inventor: Arthur H. Weinstein, Hudson, Ohio

[73] Assignee: The Goodyear Tire & Rubber Company, Akron, Ohio

[21] Appl. No.: 935,407

[22] Filed: Aug. 21, 1978

Related U.S. Application Data

[60] Continuation of Ser. No. 811,495, Jun. 30, 1977, abandoned, which is a division of Ser. No. 642,816, Dec. 22, 1975, abandoned.

[51] Int. Cl.$^2$ .................... C08F 236/16; C08F 2/26
[52] U.S. Cl. .................................... 526/292; 252/8.1; 260/DIG. 24; 526/94; 526/225; 525/348; 525/349
[58] Field of Search .................... 526/292, 305, 225

[56] References Cited

U.S. PATENT DOCUMENTS

| | | | |
|---|---|---|---|
| 3,162,613 | 12/1964 | Tousignant | 526/292 X |
| 3,210,326 | 10/1965 | Tousignant | 526/292 X |
| 3,277,053 | 10/1966 | Hill | 526/292 |
| 3,814,734 | 6/1974 | Kawasumi | 526/329 X |
| 3,817,913 | 8/1974 | Gaenzler | 526/292 X |
| 3,925,275 | 12/1975 | Musashi | 260/879 |
| 3,932,321 | 1/1976 | Maki | 260/17.4 R |
| 3,953,398 | 4/1976 | Kline | 260/45.85 B |

FOREIGN PATENT DOCUMENTS

| | | | |
|---|---|---|---|
| 49-69788 | 7/1974 | Japan | 526/292 |
| 50-21082 | 3/1975 | Japan | 526/292 |

*Primary Examiner*—C. A. Henderson
*Attorney, Agent, or Firm*—H. C. Young, Jr.

[57] ABSTRACT

An elastomeric interpolymer, method of preparation and blends thereof, where said interpolymer is comprised of (A) a conjugated diene, (B) a comonomer of selected esters and amides and (C) optionally a termonomer selected from at least one of (1) particular conjugated vinylic monomers and (2) selected alkyl esters. The elastomeric interpolymer is particularly useful for the production of industrial goods, especially when blended with thermoplastic materials.

5 Claims, No Drawings

DIENE INTERPOLYMERS WITH HALOGENATED MONOMERS

This is a continuation of application Ser. No. 811,495 filed June 30, 1977, now abandoned, which was a division of application Ser. No. 642,816, filed Dec. 22, 1975 now abandoned.

This invention relates to elastomeric compositions having enhanced flame retardancy.

BACKGROUND OF THE INVENTION

Heretofore, it has often been desired to provide elastomeric materials with enhanced flame retardance while maintaining good physical properties and low temperature qualities. Typically, flame retardance can be built into elastomers by mixing selected additives therewith exemplary of which are various inorganic compounds such as antimony pentafluoride. Such additives can provide difficulties by inherently being subject to extraction or bleeding with oils and by the potential evaporation or sublimation from the elastomer itself.

It is therefore an object of this invention to provide compositions, particularly elastomeric compositions, having a marked degree of flame retardance without the addition of or with a substantially reduced amount of flame retardant additives.

SUMMARY OF THE INVENTION

In accordance with this invention, an elastomeric interpolymer is provided comprised of (A) about 20 to about 80, preferably about 35 to about 75, weight percent units derived from a conjugated diene selected from 1,3-butadiene and isoprene, (B) about 10 to about 50, preferably about 20 to about 40, weight percent units derived from at least one comonomer selected from polyhalophenyl esters, thioesters, and polyhalophenyl amides of an acid selected from acrylic and methacrylic acid and (C) about 0 to about 35 weight percent units derived from a termonomer selected from at least one of (1) conjugated vinylic monomers selected from styrene, α-methylstyrene, acrylonitrile and α-methacrylonitrile and (2) alkyl esters of acrylic or methacrylic acid selected from ethyl acrylate, butyl acrylate, 2-ethyl hexyl acrylate and methyl methacrylate. The preferred portions of diene to polyhalogenated monomer to vinylic monomer may vary over a reasonable range depending primarily upon the combination of properties desired for a particular application.

DETAILED DESCRIPTION OF THE INVENTION

In the practice of this invention, the elastomeric interpolymers are conveniently prepared by aqueous emulsion polymerization to form the corresponding latices from which the interpolymers are recovered. In this regard, the invention is differentiated from the general practice of simple aqueous emulsion copolymerization of dienes with acrylic esters. Indeed, in the practice of this invention, the interpolymer is provided from an efficient copolymerization of the reactants to form a relatively stable latex without appreciable attendant precoagulation in the absence of special solvents or diluents.

Representative of comonomers for the interpolymers of this invention are those having the formula:

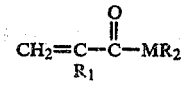

where $R_1$ is a radical selected from hydrogen and saturated alkyl radicals having 1 to 6, preferably 1 to 4, carbon atoms, $R_2$ is a phenyl radical containing 1 to 5 halogen mono substituted ring carbon atoms and M is a divalent radical selected from —O—, —S—, —NH—, and —NR$_1$— radicals.

Particularly representative of the various comonomers selected from polyhalophenyl acrylic esters, acrylic amides or acrylic thioesters for the interpolymers are pentachlorophenyl acrylate, 2,3,4,6-tetrachlorophenyl acrylate, 2,4,6-trichlorophenyl acrylate, pentabromophenyl acrylate, 2,4,6-tribromophenyl acrylate, 2,4-dibromophenyl acrylate, pentachlorophenyl methacrylate, 2,3,4,6-tetrachlorophenyl methacrylate, 2,4,6-trichlorophenyl methacrylate, pentabromophenyl methacrylate, 2,4,6-tribromophenyl methacrylate, 2,4-dibromophenyl methacrylate, pentachlorothiophenyl acrylate, pentachlorothiophenyl methacrylate, N-2,4,6-tribromophenyl acrylamide and N-2,4,6-tribromophenyl methacrylamide.

The preferred comonomers are pentachlorophenyl methacrylate and 2,4,6-tribromophenyl methacrylate.

Particularly useful comonomers which can generally be suitably interpolymerized efficiently to stable latices in high conversion include pentachlorophenyl methacrylate, 2,3,4,6-tetrachlorophenyl methacrylate, pentachlorophenyl acrylate and 2,4,6-tribromophenyl methacrylate.

In the practice of this invention, various elastomeric interpolymers can be prepared having enhanced flame retardancy. For example, such interpolymers can be prepared having very low glass transition values, such as below −80° C., as determined by differential thermal analysis, by copolymerizing a mixture containing as much as 40 weight percent pentachlorophenyl methacrylate (PCMA) and, correspondingly, as little as 60 weight percent 1,3-butadiene.

As a further example, flame-retardant rubber goods, without typical halogenated organic flame retardant additives, can be prepared as silica-reinforced sulfur vulcanizates of such a copolymer of pentachlorophenyl methacrylate and 1,3-butadiene as well as a copolymer comprised of about 60 to about 65 weight percent units derived from 1,3-butadiene, about 25 to about 30 weight percent units derived from 2,4,6-tribromophenyl methacrylate (TBMA) and correspondingly, about 0–15 weight percent units of styrene or acrylonitrile.

Although a low level of the inorganic flame retardant additive was found to be required for satisfactory flame retardancy of the PCMA-containing interpolymer stock, none was required for satisfactory flame retardance of the TBMA-containing interpolymer stock. Thus, the interpolymer composition of this invention was found to substantially diminish or eliminate the need for the typical inorganic flame retardant additive.

Both types of interpolymer rubber stocks also have demonstrated good resistance to heat aging at elevated temperatures in the range of about 100° C. Generally, vulcanizates of diene/polyhalophenyl acrylic interpolymers having about 15 percent of bound bromine are equivalent in fire retardancy to their vulcanizates containing about 20 percent bound chlorine. Such vulcanizates could be used in such applications as conveyor belts for mines.

Particular latices can be prepared useful for carpet backing applications. Latices of interpolymers containing 20 percent bound chlorine, when blended with as much as seven parts of commercially available 75/25 butadiene/styrene copolymer, in the form of latex, can be used for preparation of fire retardant foam, by addition of typical additives, including curatives, blowing agents, and hydrated alumina, but in the absence of the typically necessary and expensive additives such as chlorinated waxes, in the absence of most or all of the also relatively expensive necessary antimony oxide additives. Such foams may be used in preparation of fire retardant carpet backing and applied thereto by techniques well known to those having skill in such art.

Some of the family of interpolymer elastomers of this invention can have particularly advantageous utility where good oil resistance is required in addition to fire retardance and elasticity at low temperatures. Such interpolymers preferably are comprised of about 45 to about 70 weight percent units derived from 1,3-butadiene, about 15 to about 40 weight percent units derived from said polyhalophenyl acrylic comonomer, and about 5 to about 20 weight percent units derived from said termonomer as a nitrile substituted vinylic monomers such as acrylonitrile, preferably consisting of 10 to 15 parts of acrylonitrile units.

The degree to which the interpolymers of this invention, or their vulcanizates, exhibit an enhanced fire retardancy, varies somewhat with the proportion of required monomers.

Further examples of suitable interpolymers of this invention can relate to those having glass transition temperature in the range of about −40° C. to about −66° C. as measured by differential thermal analysis. Sulfur vulcanizates of such copolymers can have both good flame retardance, based on U.S. Bureau of Mines Standards tests, as well as good oil resistance as demonstrated by resistance to swelling in the presence of hot ASTM No. 1 oil. Oil resistance of such vulcanizates to hot ASTM No. 3 oil have been demonstrated to vary from values equivalent to the oil resistance of Neoprene W (a trademark of the E I du Pont de Nemours Co) to values equivalent to the vulcanizates of typically oil resistant medium nitrile rubbers.

In further accordance with this invention, unvulcanized blends of interpolymers of this invention having a wide variety of diene segmer contents, and hence, a wide variety in elastomeric properties, when blended with suitable proportions of combinations of thermoplastic materials selected from acrylonitrile 1,3-butadiene styrene (ABS) terpolymers and polyvinyl chloride resins, and relatively small amounts of other additives such as plasticizers, thermal stabilizers and antioxidants, have properties suitable for use as a flame retardant automotive crash pad, or dash board skin. Such blends have been demonstrated to self-extinguish a flame within one-third to one-half of the time required for a typically self-extinguishing control blend with a nitrile rubber itself containing such additives.

The proportions of monomeric segments of interpolymers of this invention may vary from one having about 60 parts of diene units, and 20 parts each of polyhaloacrylic monomers and vinylic monomer such as acrylonitrile, to one having about equal weight proportions of these three different types of monomer segmers.

The proportion of polymeric components of these blends suitable for this application vary with the elastomeric nature of the polyhaloacrylic copolymer.

When the latter copolymer is more elastomeric, and contains about 60 to 70 parts by weight of 1,3-butadiene units, one blends 60 to 80 parts of this copolymer with 80 to 100 parts of ABS resin to 100 parts of polyvinyl chloride.

When the polyhalophenyl acrylic copolymer contains only 30 to 35 parts of 1,3-butadiene units, and is more resinous in nature, one blends 100 to 130 parts of this polymer with 35 to 60 parts of ABS resin to 100 parts of polyvinyl chloride resin.

Although copolymers of this invention can be prepared by aqueous emulsion polymerization systems using free radical initiator systems, it should be appreciated that simple standard aqueous emulsion polymerization recipes off the shelf were observed to work substantially inefficiently or ineffectively. Indeed, effective systems had to be developed involving both selection and balance of the initiator/emulsifier/temperature combination.

The polymerization can conveniently be carried out essentially to completion, so that the halogen content of the polymer produced is substantially that of the monomer mixture charged. Various free radical-generating initiators can be used, representative of which are inorganic persulfates, such as potassium persulfate or ammonium persulfate, azocompounds such as bisazoisobutyronitrile. peroxyphosphates such as tetrapotassium peroxydiphosphate, certain organic peroxides or hydroperoxides such as benzoyl peroxide, paramenthane hydroperoxide and cumene hydroperoxide.

If desired, a "redox" initiator can be used for the aqueous polymerization. Although some of the halogenated monomers useful in this invention, including 2,4,6-tribromophenyl methacrylate, 2,4-dibromophenyl methacrylate, N-2,4,6-tribromophenyl methacrylamide may be incorporated efficiently into diene copolymers at levels of at least 15 percent bound halogen by the use of typical "redox" polymerization conditions without the occurrence of partial latex destabilization, difficulties are typically encountered with other monomers otherwise useful in this invention. The "redox" systems useful for this purpose include the use of a combination of hydrogen peroxide or organic peroxides or hydroperoxides with a reducing ion such as ferrous, cobaltous or cuprous ions or other reducing agents including reducing sugars, such as d-glucose and fructose or amines such as tetraethylene pentamine.

The redox polymerizations may be carried out conveniently in the range of about 0° C. to about 50° C., preferably between 5° C. and 30° C. Polymerization times vary as a matter of choice.

Free radical emulsion polymerization systems, other than redox initiated systems, are particularly preferred for effective copolymerization of pentachlorophenyl methacrylate with dienes such as butadiene or isoprene, at levels of up to 40 percent of bound monomer segments to form stable latices free of appreciable levels of precoagulum. Suitable free radical initiators for such a polymerization include azocompounds such as bisazoisobutyronitrile and inorganic peroxides such as potassium and ammonium persulfates.

It is understood that the aqueous polymerization mixtures can suitably contain various emulsifiers including fatty acid soaps, alkali metal salts of aryl sulfonates and sulfates, cationic emulsifiers and non-ionic emulsifiers.

The various non-redox free radical aqueous emulsion polymerizations can generally be carried out at temperatures in the range of about 30° C. to about 70° C., preferably about 40° C. to about 60° C. Various polymerization times can be used, such as about 5 to about 40 hours, depending primarily upon the choice of reactants, initiator and desired degree of polymerization. Typically a high degree of polymerization involving 90 to 100 percent weight conversion of the monomers to polymer is desired.

Recipes most suitable for copolymerization of a particular monomer mixture depend upon the particular application of the interpolymer. If, for example, the objective was the preparation of a gum stock of a copolymer containing a weight ratio of butadiene to PCMA monomer segment units of 62:38 from which a molded vulcanizate could be prepared, a preferred polymerization recipe would include use of a fatty acid soap emulsifier, the use of an azo-type initiator such as bis azoisobutyronitrile, about 20 parts of water, and a polymerization temperature of about 50° C. The resultant latex could be readily coagulated by typical methods, such as the use of brine and dilute mineral acid, or the use of dilute aqueous alum.

If, on the other hand, the objective is the preparation of a relatively high solids latex of a similar interpolymer suitable for use in preparing flame-retardant foam products or dipped goods, then another type of polymerization system is desirable in order to assure a maximum polymer conversion level, with maximum stability (minimum precoagulum level), in minimum time.

A preferred polymerization system for such requirements include use of a persulfate initiator, such as ammonium persulfate, a polymerization temperature of about 50° C., an alkali metal salt of an aryl sulfonic acid, such as Calsoft-F-90 (mainly sodium dodecyl benzene sulfonate) as emulsifier, a water level of between 70 to 90 parts, phm, and between 1 to 2 parts of an electrolyte such as potassium chloride to control the latex particle size.

The practice of this invention is further illustrated by reference to the following examples which are intended to be representative rather than restrictive of the scope of the invention. Unless otherwise indicated, all parts and percentages are by weight.

EXAMPLE I

Elastomeric interpolymers of butadiene with comonomers selected from various polyhalophenyl methacrylate and N-2,4,6-tribromophenyl methacrylamide by aqueous emulsion polymerization, using a modified redox recipe, and identified herein as Experiments A–G.

In particular, the aqueous emulsion polymerizations were carried out in small reactors. To the individual reactors the following recipe of Table 1 was added:

Table 1

| Ingredient | Parts, phm |
|---|---|
| distilled water | 200.0 |
| potassium stearate | 5.0 |
| tripotassium phosphate | 0.30 |
| sodium sulfate | 0.30 |
| ferrous sulfate heptahydrate | 0.011 |
| iron (Fe+3) complexing agent[1] | 0.11 |
| sodium formaldehyde sulfoxylate | 0.11 |
| benzene (in experiments A, C & D only) | 50.00 |
| monomer mixture | 100.0 |

[1] obtained as Versene FEIII from the Dow Chemical Co.

The last monomer charged into each reactor, after precooling it to 0° C. was the 1,3-butadiene which was added in slight excess over desired weight. The system was purged free of air by allowing excess butadiene to boil out. After the reactors were sealed and shaken, 0.12 parts of 50 percent active p-methane hydroperoxide were added to each. Reactors were then reshaken, allowed to warm to ambient temperature, and then tumbled mechanically in a water bath at about 50° C. for about 16 hours. Polymers were coagulated with brine, and dilute mineral acid, washed repeatedly with water, extracted several times with hot isopropyl alcohol, and oven dried. Conversions to interpolymer were essentially quantitative. The recipe and results of the copolymerizations are more clearly shown in the following Table 2.

TABLE 2

| | MONOMER CHARGE | | | | | Rubbery Interpolymer |
|---|---|---|---|---|---|---|
| Exp. | 1,3-Butadiene Parts | Comonomer | Parts | Styrene Parts | Percent Halogen | % Bound Halogen |
| A | 62.4 | pentachlorophenyl methacrylate | 37.6 | 0 | 20.0 | 20 |
| B | 57.7 | 2,3,4,6-tetraphenyl methacrylate | 42.3 | 0 | 20.0 | Not Determined |
| C | 60.6 | pentachlorothiophenyl methacrylate | 39.4 | 0 | 20.0 | Not Determined |
| D | 75.0 | pentabromophenyl methacrylate | 19.3 | 5.7 | 14.0 | 13 |
| E | 70.0 | 2,4,6-tribromophenyl methacrylate | 25.0 | 5.0 | 15.0 | 15 |
| F | 75.0 | 2,4-dibromophenyl methacrylate | 30.0 | 0 | 15.0 | 15 |
| G | 75.0 | N-2,4,6-trobromophenyl methacrylamide | 25.0 | 0 | 15.0 | 15 |

EXAMPLE II

A series of butadiene or isoprene interpolymers of the polyhalophenyl acrylic esters pentachlorophenyl methacrylate (PCMA), pentachlorophenyl acrylate (PCA), and 2,4,6-tribromophenyl methacrylate (TBMA), containing either from 18 to 20 percent chlorine or 15 percent bromine was prepared by aqueous emulsion copolymerization and identified herein as Experiments H–W.

To reactors, identified herein in Experiments H–W, were charged the following recipes indicated in Tables 3, 4 and 5. The reactors were sealed under an inert atmosphere and tumbled mechanically and maintained at the temperature/time conditions indicated by these tables.

TABLE 3
EFFECT OF RECIPE VARIABLES ON LOW SOLIDS Interpolymerization of PCMA with Isoprene

| Ingredients | H | J | K | L | M | N | P | Q | R |
|---|---|---|---|---|---|---|---|---|---|
| PCMA | 40 | 40 | 40 | 40 | 40 | 35 | 38 | 38 | 38 |
| Isoprene | 60 | 60 | 60 | 60 | 60 | 60 | 62 | 62 | 62 |
| Acrylonitrile | — | — | — | — | — | 7.5 | — | — | — |
| Acrylamide | — | — | — | — | — | 2.5 | — | — | — |
| Potassium stearate | — | — | — | — | 3.5 | — | 5.0 | 5.0 | 5.0 |
| Emulsifier A | — | — | — | 2.5 | — | — | — | — | — |
| Emulsifier B | 2.0 | 2.0 | — | — | — | 2.0 | — | — | — |
| Emulsifier C | 2.5 | 2.5 | — | — | — | 2.5 | — | — | — |
| Emulsifier D | — | — | 5.0 | — | — | — | — | — | — |
| Emulsifier E | — | — | — | 3.0 | 1.5 | — | — | — | — |
| Emulsifier F | — | — | — | 2.7 | — | — | — | — | — |
| Bis-azoisobutyro nitrile | 0.4 | 0.4 | — | — | 0.4 | 0.4 | 0.4 | 0.4 | 0.4 |
| Aqueous H$_2$O$_2$ (30%) | — | — | — | 1.0 | — | — | — | — | — |
| (NH$_4$)$_2$S$_2$O$_8$ | — | — | 0.4 | — | — | — | — | — | — |
| Water | 200 | 200 | 200 | 200 | 200 | 200 | 200 | 200 | 200 |
| t-Dodecyl mercaptan | — | — | 0.3 | 0.2 | — | — | — | — | 0.4 |
| K$_3$PO$_4$ · H$_2$O | — | — | — | — | — | — | — | — | 1.5 |

TABLE 3-A

| Conditions | H | J | K | L | M | N | P | Q | R |
|---|---|---|---|---|---|---|---|---|---|
| Temp (°C.) | 60 | 50 | 50 | 50 | 50 | 50 | 50 | 50 | 50 |
| Time (hrs) | 16 | 16 | 21 | 19 | 16 | 16 | 16 | 16 | 16 |
| Minimum Conversion (%) | 83 | 70 | 63 | 68 | 91 | 83 | 92 | 100 | 100 |
| Precoagulum (%) | 3.3 | 0 | s | tr | 12 | 1.7 | 0 | 1.3 | 0 |

NOTE:
(1) minimum conversion calculated on basis that unreacted PCMA is not volatile,
(2) s = some,
(3) tr = trace.

TABLE 3-B

| Emulsifier | Identification |
|---|---|
| A | sodium lauryl sulfate obtained as Dupanol-ME/E.I. du Pont Co. |
| B | an oleic acid isopropanolamide sulfosuccinate obtained as Sole Terge-8/Sole Chemical Corp. |
| C | sodium sulfate of an ether alcohol obtained as Hyonic JN-400SA/Nopco Chemical Co |
| D | a sodium dodecyl benzene sulfonate obtained as Calsoft F-90/Pilot Chemical Co. |
| E | a nonionic polyol obtained as Pluronic L101/Wyandotte Chemical Corp. |
| F | a sodium naphthalene sulfonate obtained as Tamol-N/Rohm & Haas Co. |

TABLE 4
EFFECT OF RECIPE VARIABLES ON LOW SOLIDS INTERPOLYMERIZATION OF PCMA, PCA OR TBMA WITH 1,3-BUTADIENE

| Ingredients | S | T | U | V | W |
|---|---|---|---|---|---|
| PCMA | 38 | 38 | 38 | — | — |
| PCA | — | — | — | 36 | — |
| TBMA | — | — | — | — | 25 |
| 1,3-Butadiene | 62 | 57 | 57 | 64 | 65 |
| Styrene | — | — | — | — | 10 |
| Acrylonitrile | — | 5 | — | — | — |
| 2-Ethylhexyl acrylate | — | — | 5 | — | — |
| Potassium stearate | 5 | 55 | 5 | 5 | 4.2 |
| Bis-azoisobutyro nitrile | 0.4 | 0.4 | 0.4 | 0.4 | 0.5 |
| t-Dodecyl mercaptan | 0.4 | 0.4 | 0.4 | 0.4 | 0.4 |
| K$_3$PO$_4$ · H$_2$O | — | — | — | — | 0.2 |
| Conditions |  |  |  |  |  |
| Temp.(°C.) | 50 | 50 | 50 | 50 | 50 |
| Time(hrs) | 16 | 16 | 16 | 23 | 17 |
| Minimum Conversion (%) | 100 | 92 | 95 | 91 | 100 |
| Precoagulum (%) | tr | 1.6 | 3.0 | tr | 0.3 |

NOTE:
(1) Conversion calculated on the basis that PCMA, PCA and TBMA are not volatile In the following Table 5, depicting high solids recipes for preparation of 1,3-butadiene/PCMA interpolymers, all the recipes used 62 parts butadiene, 38 parts PCMA, 5 parts sodium dodecylbenzene sulfonate and 0.4 part t-dodecyl mercaptan. The recipes relate to parts charged to 4-ounce bottles.

TABLE 5
HIGH SOLIDS RECIPES FOR BUTADIENE/PCMA INTERPOLYMERS

| Compound | AA | BB | CC | DD | EE | FF | GG |
|---|---|---|---|---|---|---|---|
| Bis-azoisobutyronitrile | 0.4 | 0.4 | 0.4 | — | 0.4 | — | 0.4 |
| (NH$_4$)$_2$S$_2$O$_8$ | — | — | — | 0.4 | — | 0.4 | — |
| KCl | 1.5 | 1.5 | 1.0 | 1.5 | 1.5 | 1.5 | — |
| Water | 90 | 90 | 90 | 90 | 75 | 75 | 90 |
| Polymerization Parameters |  |  |  |  |  |  |  |
| Temp (°C.) | 50 | 60 | 50 | 50 | 50 | 50 | 50 |
| Solids/100% Conv. (%) | 53.3 | 53.3 | 53.3 | 53.3 | 61.4 | 61.4 | 53.3 |
| Time (hrs) | 16.3 | 16.3 | 16.3 | 16.3 | 23.5 | 23.5 | 23.5 |
| Solids (%) | 43.2 | 54.7 | 44.3 | 41.3 | 48.4 | 47.7 | 49.8 |
| Time (hrs) | 39.5 | — | 39.5 | 39.5 | 39.5 | 39.5 | — |
| Solids (%) | 51.3 | — | 53.0 | 51.0 | 58.0 | 51.7 | — |
| Precoagulum (%) | 2.5 | 5.9 | 2.5 | 1.7 | 2.3 | 3.2 | 3.7 |

EXAMPLE III

Elastomer interpolymers of butadiene, PCMA and other conjugated vinylic monomers by aqueous emulsion polymerizations were prepared.

Polymerizations were carried out in small reactors using the monomer systems indicated in Table 6, Experiments HH-JJ, following a preferred recipe for low solids copolymerization of butadiene and PCMA shown in Table 4, Experiment S.

TABLE 6
POLYMERIZATION OF INTERPOLYMERS OF PCMA OF LOWER DIENE SEGMER CONTENT

| Monomer: | Parts, phm Monomer in Experiment: | | |
|---|---|---|---|
|  | HH | JJ | KK |
| 1,3-butadiene | 33 | 33 | 33 |
| PCMA | 33 | 33 | 33 |
| Styrene | 33 | — | — |
| Acrylonitrile | — | 33 | — |
| Methyl methacrylate | — | — | 33 |
| Conditions: | | | |
| Time, hrs | 21 | 17 | 16 |
| Temp, °C. | 40 | 50 | 40 |
| Results: | | | |
| Minimum conversion, % | 85 | 94 | 84 |
| Precoagulum, % | 0.7 | 1.3 | 0.5 |

EXAMPLE IV

Elastomeric vulcanizates of 1,3-butadiene with PCMA or TBMA having self-resistance to combustion and good heat aging properties.

The interpolymers from which these vulcanizates were obtained were prepared in high conversion in a 5-gallon reactor by following the general procedure of Table 4, Experiment S. The properties of both the copolymers and the resultant vulcanizates are characterized in Table 7.

Recipes used in curing the polymers are indicated in Table 8. Compounded stocks were cured for time periods necessary for attainment of 90 percent of optimum cure, based on Monsanto rheometer data.

A screening test for fire-retardance was based upon ignition of a $\frac{1}{4}''\times\frac{1}{2}''\times 6''$ bar of vulcanizate in a laboratory hood with a draft. Samples which did not self-extinguish a flame within 30 seconds, or glowed for one minute after the flame was extinguished, were considered to fail the test.

The changes in ultimate tensile strength and ultimate elongation values which occurred after oven aging of vulcanizates for 4 days at 100° C. are indicated in Table 7 as percentage increases or decreases of original values. All polymers had been stabilized with 1.5 parts of phenolic antioxidant before coagulation, and with an additional 1.0 part of an amine antioxidant during compounding.

TABLE 7
RELATIONSHIP OF FIRE RETARDANCE AND OTHER PROPERTIES OF CERTAIN BUTADIENE/POLYHALOPHENYL ACRYLIC ESTER INTERPOLYMER VULCANIZATES TO HALOGEN CONTENT AND CURE RECIPE

| Monomers: | Parts, phm, Monomer in Experiments: | | | | | | |
|---|---|---|---|---|---|---|---|
|  | LL | MM | NN | PP | QQ | RR | SS |
| Butadiene | 62.0 | 62.0 | 62.0 | 67.8 | 60.0 | 65.0 | 70.0 |
| PCMA | 38.0 | 38.0 | 38.0 | 32.2 | — | — | — |
| TBMA | — | — | — | — | 3 | — | — |
| Styrene | — | — | — | — | 9.0 | 10.0 | 10.0 |
| Bound Halogen: | | | | | | | |
| Chlorine, % | 20.0 | 20.0 | 20.0 | 17.1 | — | — | — |
| Bromine, % | — | — | — | — | 18.0 | 15.0 | 12.5 |
| Vulcanization: | | | | | | | |
| Cure recipe No. | 1 | 1 | 2 | 2 | 3 | 3 | 3 |
| Other Additives: | | | | | | | |
| Parts Sb$_2$O$_3$ | 0 | 4.5 | 3.0 | 3.0 | — | 0 | 0 |
| Parts tricresyl phosphate | 10 | 10 | 20 | 20 | 10 | 10 | 10 |
| Cure time, min. at 285° F. | 35 | 35 | 30 | 30 | 30 | 20 | 20 |
| Vulcanizate Properties: | | | | | | | |
| Tensile strength psi | 2240 | 2060 | 1776 | 2030 | 1925 | 2335 | 2130 |
| Change on aging % | −5 | −4 | −17 | −10 | −10 | −42 | −32 |
| Ult elong, % | 485 | 475 | 420 | 485 | 525 | 475 | 430 |
| Change on aging % | −24 | −34 | −69 | −41 | −9 | −52 | −49 |
| Shore A hardness | 83 | 83 | 74 | 73 | 73 | 75 | 75 |
| Fire resistance: | | | | | | | |
| Flame out, Sec | burned | 9 | 5 | burned | 0 | 6.5 | burned |
| Afterglow, Sec | — | 0 | 0 | — | 0 | 0 | — |
| Acceptable | no | yes | yes | no | yes | yes | no |
| Smoke generation | — | med | low | appr | appr | appr | appr |
| Oil resistance: | | | | | | | |
| Vol swell 70 hr/150° F. in: | | | | | | | |
| ASTM No 1 oil, % | — | — | 31 | 33 | — | — | — |
| ASTM No 3 oil, % | — | — | 54 | — | — | 189 | 201 |

CODE: med: medium; appr: appreciable

TABLE 8

| Ingredients | Vulcanization recipes | | |
|---|---|---|---|
|  | Parts, phr in Recipe No: | | |
|  | 1 | 2 | 3 |
| Polymer | 100.00 | 100.0 | 100.0 |
| Silica | 50.0 | 50.0 | 50.0 |
| Hydrated alumina | 20.0 | 20.0 | 20.0 |
| Zinc oxide | 5.0 | 5.0 | 5.0 |
| Mixed aryl p-phenylene diamines | 1.0 | 1.0 | 1.0 |
| Calcium stearate | 1.5 | — | — |
| Polyethylene glycol | 2.0 | 2.0 | 2.0 |
| Sulfur | 1.1 | 1.5 | 1.5 |
| N,N'-dimorpholinyl disulfide | 1.1 | 1.1 | — |
| 2-Benzothiazolyl-N,N'-diethyl thiocarbamyl | | | |

TABLE 8-continued

| | Vulcanization recipes | | |
|---|---|---|---|
| | Parts, phr in Recipe No: | | |
| Ingredients | 1 | 2 | 3 |
| sulfide | 1.1 | 1.1 | — |
| Bis (2-benzothiazolyl) disulfide | — | — | 1.0 |
| Tetramethyl thiuram disulfide | — | — | 0.3 |

EXAMPLE V

A series of butadiene/PCMA (pentachlorophenyl methacrylate) were prepared varying the PCMA content from about 10 to about 40 percent which are identified herein as Experiments TT–WW. Such polymers were prepared by copolymerizing the monomers to a high conversion by following the general procedure indicated in Example III, using the recipe and conditions indicated in Table 4, Experiment S. The copolymer latices were then stabilized with 1.5 parts of a phenolic antioxidant, and isolated by straining the latices from precoagulum, and coagulating with alum. The resulting coagula were washed three times with water and dried in a hot air oven for about 3 hours at about 180° F. The chlorine content and glass transition temperature (Tg) of small samples of each polymer which had been extracted free of traces of residual monomer with hot isopropyl alcohol, and then dried, were determined. The Tg values were determined by means of a differential scanning calorimeter.

These polymers were compounded using the recipe indicated in Table 9, pressed into 6"×6"×0.055" sheets and cured at 285° F. for time periods varying from 20 to 25 minutes as needed to achieve 90 percent of optimum cure.

TABLE 9

| Vulcanization Recipe | |
|---|---|
| Ingredient | Parts, phr |
| Copolymer | 100.0 |
| Silica | 50.0 |
| Wingstay-100 | 1.0 |
| Stearic acid | 1.0 |
| Zinc oxide | 2.0 |
| Polyethylene glycol | 2.0 |
| Sulfur | 1.1 |
| N,N'-dimorpholinyl disulfide | 1.1 |
| 2-Benzothiazolyl-N,N'-diethyl thiocarbamyl sulfide | 1.1 |

The copolymer vulcanizates were then tested for their stress/strain properties, low temperature properties and resistance to oils with different aniline points and degrees of aromaticity. Such physical properties of the copolymers are more clearly shown in the following Table 10.

TABLE 10

PHYSICAL PROPERTIES OF DIFFERENT BUTADIENE/PCMA INTERPOLYMER GUM STOCKS AND VULCANIZATES

| | Experiments: | | | | |
|---|---|---|---|---|---|
| Parameters: | UU | VV | WW | XX | SBR |
| B/PCMA charge weight ratios | 90/10 | 80/20 | 70/30 | 60/40 | |
| Gum stocks | | | | | |
| % Cl, theory | 5.30 | 10.6s | 15.9 | 21.2 | |
| % Cl, found | 5.49 | 10.4 | 15.4 | 20.5 | |
| Glass transition, °C. | −89 | −84 | −82 | −83 | −52* |
| Vulcanizates | | | | | |
| Tensile, psi | 1450 | 1680 | 1770 | 2020 | 2550** |
| Elongation, % | 390 | 560 | 500 | 460 | 620** |
| Scott brittle pt, °C. | −75 | −74 | −75 | −64 | |
| % Vol increase in oil after 72 hours at: | | | | | |
| Solvent(A)***, 75° F. | 135 | 164 | 153 | 117 | |
| ASTM No 1,300° F. | 104 | 99 | 98 | 76 | |
| ASTM No 3,300° F. | 178 | 241 | 207 | 180 | |

*Data for a 76.5/23.5 butadiene/styrene copolymer from Brandrup and Immergut "Polymer Handbook", Interscience, NY (1966) Chapter VI, p 61
**Data by Allen et al, India Rubber World, 112, 309–312 (1945) for a similarly reinforced GR-S (SBR) vulcanizate
***A 70/30 isooctane/toluene mixture by volume

EXAMPLE VI

A series of terpolymers of butadiene, selected comonomers and acrylonitrile were prepared by aqueous emulsion copolymerization and identified herein in Experiments AAA to FFF. The copolymers were prepared by polymerizing monomer mixtures indicated in Table 11 in small reactors, for 18 hours at 50° C., according to conditions indicated in Example II using the recipe cited in Table 4, Experiment S, and working up the polymers as indicated in Example V. Small samples of each polymer were prepared for halogen and nitrogen analysis and for Tg, (glass transition temperature), determinations by extracting repeatedly with hot isopropyl alcohol and vacuum drying.

TABLE 11

PARAMETERS RELATING TO TERPOLYMERIZATION OF BUTADIENE, ACRYLONITRILE AND PCMA OR TBMA IN EMULSION AT 50° C.

| Experiments | AAA | BBB | CCC | DDD | EEE | FFF |
|---|---|---|---|---|---|---|
| Monomer ratios charged/found: | | | | | | |
| B | 65.0/ 65.0 | 55.0/ 55.6 | 50.0/ 51.6 | 60.0/ 58.7 | 65.0/ 65.0 | 60.0/ 60.9 |
| PCMA | 20.0/ 20.0 | 30.0/ 30.0 | 35.0/ 33.4 | 30.0/ 30.0 | | |
| TBMA | | | | | 25.0/ 25.2 | 25.0/ 24.5 |
| AN | 15.0/ 15.0 | 15.0/ 14.4 | 15.0/ 15.0 | 10.01 11.3 | 10.0/ 9.80 | 15.0/ 14.6 |
| % Solids | 34.1 | 34.2 | 34.5 | 34.2 | 35.6 | 35.5 |
| % Conversion | 98.6 | 98.7 | 99.6 | 98.7 | 100 | 100 |
| % Precoagulum | 1.2 | 1.0 | 1.5 | 1.5 | 0.2 | 0.2 |

The gum stocks were compounded, pressed into sheets and cured following the same procedures indicated in Example V, and using the cure recipe indicated in Table 9.

Such parameters as glass transition temperatures of the gum stocks as well as low temperature, stress-strain, oil resistance and fire-retardant properties of the terpolymer vulcanizate are indicated in Table 12. It is to be noted that no flame-retardant additives such as hydrated alumina, antimony trioxide or special halogenated compounds were introduced into these vulcanizates.

TABLE 12

PHYSICAL PROPERTIES OF GUM STOCKS AND SILICAN LOADED VULCANIZATES OF TERPOLYMERS OF BUTADIENE AND ACRYLONITRILE WITH PCMA OR TBMA

|  | AAA | BBB | CCC | DDD | EEE | FFF | Medium Nitrile NBR | Neoprene W** | Neoprene ILA*** |
|---|---|---|---|---|---|---|---|---|---|
| Monomer Charge Ratios: |  |  |  |  |  |  |  |  |  |
| Butadiene | 65.0 | 55.0 | 50.0 | 60.0 | 65.0 | 60.0 | 67 |  |  |
| PCMA | 20.0 | 30.0 | 35.0 | 30.0 |  |  |  |  |  |
| TBMA |  |  |  |  | 25.0 | 25.0 |  |  |  |
| Acrylonitrile | 15.0 | 15.0 | 15.0 | 10.0 | 10.0 | 15.0 | 33 |  |  |
| $T_g$ of gum, °C. | −58 | −50 | −41 | −61 | −66 | −49 | −39 | −38 |  |
| Vulcanizate Properties |  |  |  |  |  |  |  |  |  |
| Gehman $T_{10}/T_{100}$, °C./°C. | −17/ −37 | −11/ −34 | −7/ −30 | −14/ −46 | −19/ −44 | −21/ −38 |  |  |  |
| Scott brittle pt, °C. | −40 | −30 | −14 | −38 | −50 | −42 | −40 |  | −4.4 |
| Ultimate tensile, psi | 3070 | 3080 | 3320 | 2860 | 2260 | 2250 | 3700 | 3000 | 2450 |
| Ultimate elongation % | 610 | 540 | 460 | 400 | 490 | 490 | 740 | 700 | 420 |
| Volume increase in 72 hrs: |  |  |  |  |  |  |  |  |  |
| in ASTM No. 1 oil, at 300° F., % | 6.0 | 4.7 | −.9 | 9.9 | 21 | 4.7 | 2.2 | 12(255° F.) |  |
| in ASTM No. 3 oil, at 300° F., % | 72 | 57 | 41 | 93 | 125 | 49 | 25 | 90(157° F.) | 7 |
| in Larmol at 75° F., % | 68 | 60 | 46 | 72 | 77 | 52 | 43 |  |  |
| Fire retardance: |  |  |  |  |  |  |  |  |  |
| Seconds to flameout | 57 | 40 | 24 | 33 | 15 | 28 |  |  |  |
| Seconds afterglow | 0 | 0 | 0 | 0 | 0 | 0 |  |  |  |
| General Rating* | OK | OK | OK | OK | OK | OK |  | OK |  |

*Maximum acceptable flameout and afterglow times for samples were 1 minute and 3 minutes respectively.
**Data on a similarly reinforced white stock of Neoprene W, the most oil and heat resistant commercial polychloroprene from "The Neoprenes" a 1963 DuPont handbook.
***Data on a black loaded vulcanizate of this commercial chloroprene-acrylonitrile copolymer from the same DuPont handbook.

EXAMPLE VII

Preparation of fire-retardant foams from butadiene polyhaloacrylic ester copolymer latices were prepared.

High solids butadiene copolymer latices were prepared by charging the recipes, indicated in Experiments GGG and JJJ, Table 13, into small reactors under inert atmosphere, and allowing the mixtures to tumble in constant temperature baths under conditions specified. The latices so obtained in high conversion were stabilized by addition of 0.2 part of a conventional shortstopping agent, and strained free of precoagulum.

The butadiene/PCMA copolymer latex (Experiment GGG) was blended with a commercially available butadiene 72/25 butadiene/styrene (SBR) copolymer latex (obtained as Pliolite-5356K, from The Goodyear Tire & Rubber Company) and compounded with other additives as indicated in Table 14. The butadiene/TBMA/styrene terpolymer latex was blended both with this SBR latex (69.2% solids) and with a low ammonia natural rubber (NR) latex (type III) (62.0% solids) in proportions of 54.0 parts of TBMA terpolymer latex to 26.0 parts os SBR latex to 20.0 parts of NR latex and the blend concentrated to 61.0% solids in a disc evaporator for 6-7 hours at 40°-50° C. and then compounded as indicated in Table 12.

A control SBR latex was compounded similarly with the exception that in addition some chlorinated paraffin and a higher level of antimony oxide were added (see Table 13).

The compounded latices were beaten with a whisk in air until their volumes had increased from 3 to 6 fold. They were poured into jute cloth and baked for 20 minutes at 280° F.

The resultant foam rubbers were tested with respect to physical standards and fire-retardant standards for high density foams set by the Rubber Manufacturers Association (RMA). Foams so prepared containing either the PCMA terpolymer or the TBMA terpolymer as components met all the requirements of the RMA for such applications as fire retardant carpet backing. Some of the pertinent physical properties and fire retardant properties of the foams are indicated in Table 14.

TABLE 13

INTERPOLYMER LATEX RECIPES AND POLYMERIZATION PARAMETERS

| | Parts, phm in experiments: | |
|---|---|---|
| Ingredients: | HHH | JJJ |
| 1,3-butadiene | 62.0 | 60.0 |
| PCMA | 38.0 | — |
| TBMA | — | 20.0 |
| Styrene | — | 20.0 |
| Tertiary dodecyl mercaptan | 00.4 | 0.4 |
| Bis-azoisobutyronitrile | 0.4 | 0.4 |
| Sodium dodecyl benzene sulfonate | 3.0 | — |
| Potassium oleate | — | 4.5 |
| KCl | 1.2 | — |
| Distilled $H_2O$ | 90.0 | 200.0 |
| Conditions: | | |
| Temperature, °C. | 50 | 50 |
| Time, hrs | 40 | 16 |
| Time, hrs | 40 | 16 |
| Solids, % | 58.5 | 31.4 |
| precoagulum, % | 3.0 | 0.1 |

TABLE 14

COMPOUNDING OF LATEX BLENDS

| | Parts, phr of dry ingredients in Exp: | | |
|---|---|---|---|
| Ingredients: | GGG | JJJ | Control |
| B/PCMA latex | 31.5 | — | — |
| B/TBMA/S latex | — | 35.5 | — |
| SBR latex | 68.5 | 38.1 | 100 |
| NR latex | — | 26.4 | — |
| Phenolic antioxidant | 1.0 | 0.8 | 1.0 |

TABLE 14-continued
COMPOUNDING OF LATEX BLENDS

| Ingredients: | Parts, phr of dry ingredients in Exp: | | |
|---|---|---|---|
| | GGG | JJJ | Control |
| Potassium oleate (17.9%) | 1.0 | 1.5 | 1.0 |
| Wetting agent | 1.5 | 2.0 | 1.5 |
| NH$_4$OH, conc | — | 0.28 | — |
| Trimene base | — | 0.35 | — |
| Hydrated Al$_2$O$_3$ | 150 | 150 | 150 |
| Sb$_2$O$_3$ | 1.0 | 1.0 | 3.0 |
| Chlorinated paraffin | — | — | 10.0 |
| Sulfur | 1.8 | 2.0 | 1.5 |
| Zinc oxide | 2.0 | 2.0 | 2.0 |
| Zinc mercaptobenzothiazole | 2.0 | 1.0 | 2.0 |
| Zinc diethyldithiocarbamate | 1.0 | 1.0 | 1.0 |
| TOTAL HALOGEN | 6.5 | 6.5 | 6.5 |

1 - wetting agent obtained as Arosol 18 (35%) from American Cyanamid Co

TABLE 15
PHYSICAL AND FIRE-RETARDANT PROPERTIES OF FOAMS

| PARAMETER | Experiment: | | CONTROL |
|---|---|---|---|
| | GGG | GGG | SBR FOAM |
| Density, lb/ft$^3$ | 16.7 | 16.9 | 17.4 |
| Permanent set, % recovery | 89.1 | 87.5 | 89.3 |
| Tensile strength, psi | 22 | 26 | 22 |
| Ult elongation, % | 215 | 270 | 340 |
| Delamination, g/in | 429 | 661 | 515 |
| Afterflame, seconds[1] | 1 | 17 | 6 |
| Smolder, seconds | 47 | 40 | 35 |
| Smoke obsuration time, min | 1.77 | 1.05 | 1.50 |
| Fire retardant rating | OK | OK | OK |

[1] Fisher Body Division, General Motors Co match test.

EXAMPLE VIII

Preparation of polymer blends containing elastomeric copolymers of polyhalophenyl acrylic esters which are suitable for use in such applications as fire-retardant automobile crash pad skins.

Two different terpolymers, one a 33:33:33 butadiene/PCMA/acrylonitrile terpolymer whose preparation is described in Example III, Table 5, Experiment JJ, the other, a 60:20:19 butadiene/TBMA/acrylonitrile terpolymer prepared in the same manner as a very similar polymer whose preparation and characterizations are indicated in Example VI, Table 10, Experiment FFF, were blended on a mill with commercially available polyvinyl chloride (Pliovic-K-70) and a commercially available 33:33:33 butadiene/acrylonitrile styrene resin along with other additives as indicated in Table 15, Experiments KKK and LLL.

The blends are compared in physical properties and fire retardant characteristics with a control polymer blend, containing as its elastomeric component a commercially available 67:33 butadiene/acrylonitrile rubber gum stock (obtained as Chemigum N-8, from The Goodyear Tire & Rubber Company) in this table. Flammability tests were conducted as nearly as possible in conformity to Motor Vehicle Safety Standard No. 302. Both experimental blends as well as the control blend passed the requirement that the sample of 0.04 inch gauge burned at a rate slower than 4 inches per minute. All blends were self extinguishing with in the time periods indicated.

TABLE 16
INTERPOLYMER BLEND COMPOSITIONS AND THEIR PHYSICAL AND FLAME-RETARDANT PROPERTIES

| Ingredients: | Parts, phr in Experimental Blend | | |
|---|---|---|---|
| | KKK | LLL | Control |
| Polyvinyl chloride[1] | 100.0 | 100.0 | 100.0 |
| Epoxide plasticizer[2] | 12.5 | 12.5 | 12.5 |
| Octyl diphenyl phosphate[3] | 12.5 | 12.5 | 12.5 |
| Organic tin mercaptide stabilizer[4] | 3.0 | 3.0 | 3.0 |
| Phenolic antioxidant[5] | 0.5 | 0.5 | 0.5 |
| ABS resin[6] | 60.0 | 80.0 | 100.0 |
| B/AN rubber[7] | — | — | 62.5 |
| B/PCMA/AN terpolymer | 100.0 | — | — |
| B/TBMA/AN terpolymer | — | 80.0 | — |
| Sb$_2$O$_3$ | 3.0 | 3.0 | 3.0 |
| Properties: | | | |
| Tensile strength, psi | 2700 | 2000 | 2090 |
| Ult elongation, % | 280 | 305 | 280 |
| 100% Modulus, psi | 1770 | 1500 | 1580 |
| Shore B hardness | 91 | 82 | 84 |
| Shore D hardness | 67 | 52 | 55 |
| Scott brittle pt, °C. | −35 | −37 | −34 |
| Olsen stiffness, psi | 18,100 | 13,800 | 19,700 |
| Flammability: | | | |
| Time to extinguish, min | 1.00 | 1.45 | 3.45 |

[1] Obtained as Pliovic K-70 from The Goodyear Tire & Rubber Company
[2] Obtained as Paraplex G62 from The Rohm & Haas Co
[3] Obtained as Santicizer 141 from The Monsanto Company
[4] Obtained as Thermolite 31 from the M & T Chemical Co
[5] Obtained as Wingsway L from The Goodyear Tire & Rubber Company
[6] Obtained as Blendex 301 from The Borg Warner Plastics Division
[7] Obtained as Chemigum N-8 from The Goodyear Tire & Rubber Company It should be re-emphasized, as it can be illustrated by the examples and in the body of the specification, that this invention provides an enhanced process for preparing, in high conversion, a stable latex (characterized by containing either little or no precoagulum) of required interpolymer by an emulsion polymerization in a system containing a bis-azo type initiator and a fatty acid soap emulsifier. The invention relates to an enhanced process for efficiently preparing in high conversion a stable latex containing a high polymer solids level (over 40 weight percent polymer solids) of the required interpolymer in a form suitable for use in the preparation of foams and dipped goods, through the use of an emulsion polymerization system containing either bis-ago compound or a peroxide compound, such as, for example, persulfate as an initiator, utilized alkali metal salt of an organic sulfonic acid as an emulsifier, a low level of inorganic electrolyte, such as potassium chloride containing less than about 100 parts water per hundred parts by weight charged monomer, and using a polymerization temperature in the range of about 40° to about 60° C.

Typically, high conversions can be obtained in the range of at least about 90 percent and preferably about 95 percent. Various polymer solid levels can be obtained, depending upon the intended use. For example, a wide range of solid levels can be utilized if the latex has a purpose of being converted to simple gum stock; however, if the latex is to be used for preparation of other material, such as foams and dipped goods, a higher polymer solids level can be obtained, such as in the range of about 40 percent to about 60 percent, while still maintaining a stable latex.

It should be appreciated that although it is taught herein that a desired polymerization temperature range is about 40° C. to about 60° C. for various aqueous emulsion polymerizations, the polymerization temperature can be preferably narrowed to one of about 50° C. or, in other words, 46° to about 54° C., in order to particularly enchance a very low precoagulum formation. Such a more narrow temperature range may be particularly desired where it is required to conduct the polymerization within a reasonably short time.

While certain representative embodiments and details have been shown for the purpose of illustrating the invention, it will be apparent to those skilled in this art that various changes and modifications may be made therein without departing from the spirit or scope of the invention.

What is claimed is:

1. An elastomeric interpolymer prepared by the method which comprises aqueous emulsion polymerizing, at a temperature in the range of about 40° C. to 60° C., in the presence of a free radical generating catalyst selected from at least one of bis-azo isobutyronitrile, postassium persulfate, ammonium persulfate, benzoyl peroxide, p-methane hydroperoxide and cumene hydroperoxide and in the presence of an alkali metal salt of an organic sulfonic acid emulsifier, a monomer mixture comprised of (A) about 45 to about 70 weight percent dienes selected from at least one of 1,3-butadiene and isoprene, (B) about 15 to about 40 weight percent of at least one comonomer selected from pentachlorophenyl methacrylate, 2,4,6-tribromophenyl methacrylate, 2,3,4,6-tetrachorophenyl acrylate, 2,4,6-trichlorophenyl acrylate, pentabromophenyl acrylate, 2,4,6-tribromophenyl acrylate, 2,4-dimbromophenyl acrylate, pentachlorophenyl methacrylate, 2,3,4,6-tetrachlorophenyl methacrylate, 2,4,6-trichlorophenyl methacrylate, pentabromophenyl methacrylate, 2,4-dibromophenyl methacrylate, pentachlorothiophenyl acrylate, pentachlorothiophenyl methacrylate, N-2,4,6-tribromophenyl acrylamide and N-2,4,6-tribromophenyl methacrylamide, and (C) about 5 to about 20 weight percent of a termonomer selected from at least one of (1) styrene, α-methyl styrene, acrylonitrile and α-methacrylonitrile, or (2) alkyl esters selected from at least one of ethyl acrylate, butyl acrylate, 2-ethyl hexyl acrylate and methyl methacrylate; where said elastomeric interpolymer has a glass transition temperature in the range of about −40° C. to about −66° C.

2. The interpolymer of claim 1 comprised of (A) about 45 to about 70 weight percent units derived from 1,3-butadiene, (B) about 15 to about 40 weight percent units derived from a comonomer selected from pentachlorophenyl methacrylate and 2,4,6-tribromophenyl methacrylate and (C) about 5 to about 20 weight percent units derived from said termonomer selected from nitrile substituted vinylic momomers.

3. The interpolymer of claim 2 where said termonomer is acrylonitrile.

4. The interpolymer of claim 1 where said comonomer is selected from pentachlorophenyl methacrylate and 2,4,6-tribromophenyl methacrylate.

5. The interpolymer of claim 1 comprised of (A) about 60 to about 70 weight percent units derived from 1,3-butadiene, (B) about 25 to about 30 weight percent units derived from a comonomer selected from pentachlorophenyl methacrylate and 2,4,6-tribromophenyl methacrylate and (C) about 10 to about 15 weight percent units derived from styrene.

* * * * *